US008761519B2

(12) United States Patent
Chang et al.

(10) Patent No.: US 8,761,519 B2
(45) Date of Patent: Jun. 24, 2014

(54) SYSTEM AND METHOD FOR SELECTING AN OBJECT BOUNDARY IN AN IMAGE

(75) Inventors: Ming-Hsiu Chang, Douliu (TW); Chung-Yi Weng, Taichung (TW)

(73) Assignee: Cyberlink Corp., Shindian, Taipei (TW)

( * ) Notice: Subject to any disclaimer, the term of this patent is extended or adjusted under 35 U.S.C. 154(b) by 174 days.

(21) Appl. No.: 13/616,888

(22) Filed: Sep. 14, 2012

(65) Prior Publication Data

US 2014/0078152 A1 Mar. 20, 2014

(51) Int. Cl.
*G06T 7/00* (2006.01)

(52) U.S. Cl.
USPC .......................................................... 382/199

(58) Field of Classification Search
None
See application file for complete search history.

(56) References Cited

U.S. PATENT DOCUMENTS 5,617,487 A * 4/1997 Yoneyama et al. ........... 382/199
5,940,538 A * 8/1999 Spiegel et al. ................ 382/236
6,025,850 A * 2/2000 Gupta ........................... 345/442
7,076,099 B2 * 7/2006 Kondo et al. ................. 382/203
7,424,149 B2 * 9/2008 Gerard et al. ................. 382/173
8,565,532 B2 * 10/2013 Wang et al. ................... 382/199
2011/0206282 A1 8/2011 Aisaka

FOREIGN PATENT DOCUMENTS

WO WO 01/26050 A2 * 4/2001
WO 2009154951 12/2009

OTHER PUBLICATIONS

Tan, Kar-Han, and Narendra Ahuja. "Selecting objects with freehand sketches." Computer Vision, 2001. ICCV 2001. Proceedings. Eighth IEEE International Conference on. vol. 1. IEEE, 2001.*
Xu, Ning, T. Yu, and N. Ahuja. "Interactive object selection using st minimum cut." Proceedings of Asian Conference on Computer Vision. vol. 3. 2004.*

* cited by examiner

*Primary Examiner* — Chan Park
*Assistant Examiner* — Geoffrey E Summers
(74) *Attorney, Agent, or Firm* — McClure, Qualey & Rodack, LLP

(57) ABSTRACT

Disclosed are various embodiments for the selection of an object boundary shown in an image. An initial boundary probability map of an image is generated by one or more computing devices. A first input path segment is obtained, and a selection path is generated based on the first input path segment and the initial boundary probability map. A weighted boundary probability map is generated based on the selection path. A second input path segment is obtained, and a replacement selection path is generated based on the weighted boundary probability map and the second input path segment.

32 Claims, 7 Drawing Sheets

SYSTEM AND METHOD FOR SELECTING AN OBJECT BOUNDARY IN AN IMAGE

TECHNICAL FIELD

The present disclosure generally relates to selecting a boundary in a digital image for image processing functions.

BACKGROUND

An image processing application may be used to edit various characteristics of a digital image. For example, it may be the case that a particular region within an image is to have its contrast, luminosity, or other characteristic edited. To this end, a user may trace an object boundary shown in the image in order to select the region for editing. However, tracing the region may be slow, tedious, and subject to error. Thus, there exists a desire to facilitate the selection of an object boundary shown in an image.

SUMMARY

One embodiment is a non-transitory computer-readable medium that embodies a program executable in a computing device. The program comprises code that obtains an image comprising a plurality of pixels. The program further comprises code that obtains a first input path segment from an input device, the first input path segment corresponding to an object boundary shown in the image, the first input path segment comprising a plurality of first input points corresponding to a plurality of the pixels. The program further comprises code that generates an initial boundary probability map for at least a portion of the image, the initial boundary probability map comprising a plurality of boundary probability values corresponding to a plurality of the pixels. The program further comprises code that generates a selection path based on the first input path segment and the initial boundary probability map, the selection path indicating a region within the image that is to be selected for an image editing function, the selection path comprising a plurality of selection points corresponding to a plurality of the pixels. The program further comprises code that obtains a second input path segment from the input device, the second input path segment corresponding to the object boundary shown in the image, the second input path segment comprising a plurality of second input points corresponding to a plurality of the pixels. The program further comprises code that generates a weighted boundary probability map by weighting a plurality of the boundary probability values the initial boundary probability map based on the selection path. The program further comprises code that generates a replacement selection path based on the weighted boundary probability map and the second input path segment.

Another embodiment is a system that comprises at least one computing device and an image processing engine executable in the at least one computing device. The image processing engine comprises logic configured to obtain a first input path segment corresponding to an object boundary shown in an image. The image processing engine further comprises logic configured to generate an initial boundary probability map of at least a portion of the image. The image processing engine further comprises logic configured to generate a selection path based on the initial boundary probability map and the first input path segment. The image processing engine further comprises logic configured to obtain a second input path segment corresponding to the object boundary shown in the image. The image processing engine further comprises logic configured to generate a weighted boundary probability map by weighting at least a portion of the initial boundary probability map based on the selection path. The image processing engine further comprises logic configured to generate a replacement selection path based on the weighted boundary probability map and the second input path segment.

Another embodiment is a method comprising the step of obtaining, in at least one computing device, a first input path segment corresponding to an object boundary shown in an image. The method further comprises the step of generating, in the at least one computing device, an initial boundary probability map of at least a portion of the image. The method further comprises the step of generating, in the at least one computing device, a selection path based on the initial boundary probability map and the first input path segment. The method further comprises the step of obtaining, in the at least one computing device, a second input path segment corresponding to the object boundary shown in the image. The method further comprises the step of generating, in the at least one computing device, a weighted boundary probability map based on the initial boundary probability map and the selection path. The method further comprises the step of replacing, in the at least one computing device, the selection path with a replacement selection path based on the weighted boundary probability map and the second input path segment.

Other systems, methods, features, and advantages of the present disclosure will be or will become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments described herein are directed towards facilitating the selection of an object boundary or region shown in an image. As a non-limiting example, an image may be obtained by a computing device, and an initial boundary probability map may be generated for the image. A user may define an input path segment by tracing around a portion of an object boundary shown in the image. A selection path may be generated based on the input path segment and the initial boundary probability map. Additionally, a weighted boundary probability map may be generated by weighting the initial boundary probability map based on the selection path. For example, portions of the initial boundary probability map that are relatively close to the selection path may be weighted heavier than portions that are farther from the selection path. Also, the speed at which the user traces respective portions of the object boundary shown in the image may influence the weighting of the initial boundary probability map. For instance, areas of the initial boundary probability map that are near a portion of the boundary that was traced relatively slowly may have a relatively heavy weighting.

Thereafter, the user may define an extended input path segment by tracing around an additional portion of the boundary in the image. Using the extended input path segment and the weighted boundary probability map, a replacement selection path is generated that replaces the original selection path. More extended input path segments may be provided, and the process may be repeated for each of the extended input path segments. Upon the final selection path being generated, a region defined by the selection path may be selected, for example, to facilitate an image editing function. In the following discussion, a general description of the system and its components is provided, followed by a discussion of the operation of the same.

Figure 1:
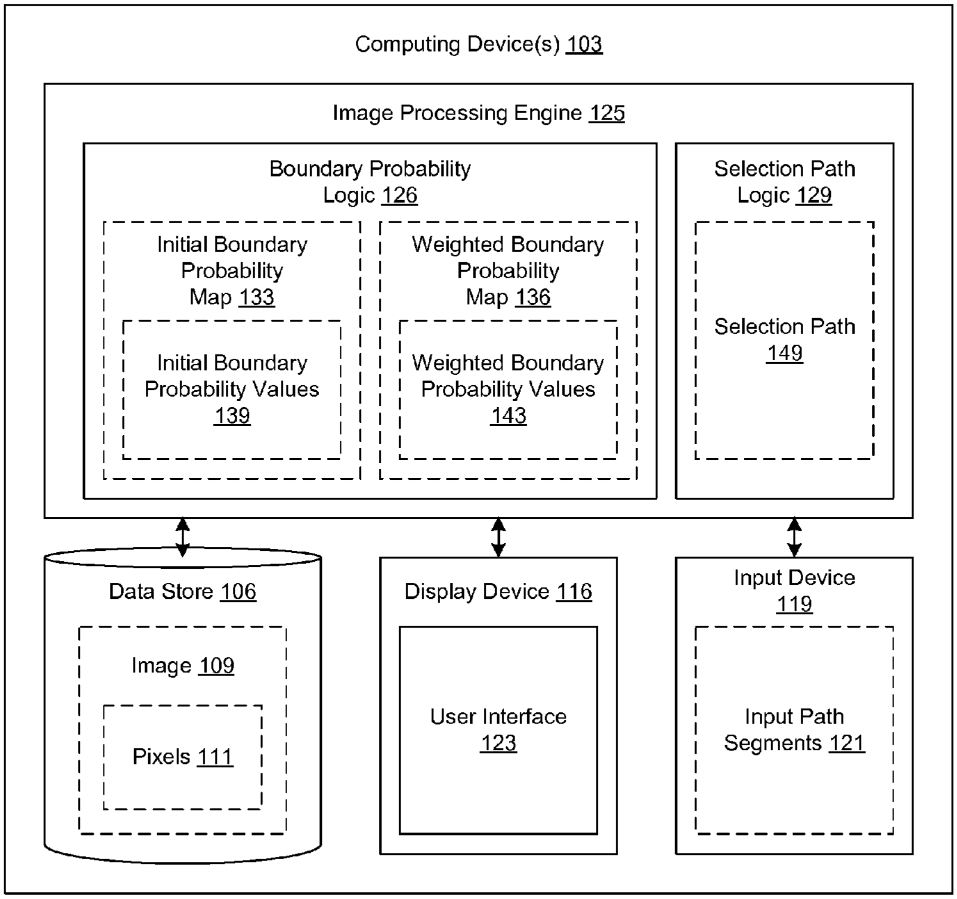
FIG. 1 is a drawing of computing device according to various embodiments of the present disclosure.

With reference to FIG. 1, shown is an example of a computing device 103. The computing device 103 may comprise, for example, a processor-based system such as a computer system. Such a computer system may be embodied in the form of a desktop computer, a laptop computer, a cellular telephone, a set-top box, a music player, a web pad, a tablet computer system, a personal digital assistant, a game console, or other device with like capability.

Various data is stored in a data store 106 that is accessible to the computing device 103. The data stored in the data store 106 may be associated with the operation of the various applications and/or functional entities described below. For instance, the data store 106 may include one or more images 109 and other data.

The image 109 may be, for example, visual data obtained from an imaging device (not shown) or generated by the computing device 103 or another device. As may be appreciated by a person having ordinary skill in the art, the image 109 may include multiple pixels 111, wherein each pixel 111 has one or more values, for example, defining a color intensity level or other characteristic.

The computing device 103 may include a display device 116, an input device 119, and possibly other components. The input device 119 may facilitate the input of data by a user. To this end, the input device 119 may be embodied in the form of a mouse, keyboard, touch pad, touch screen, stylus, and/or any other type of device capable of inputting data into the computing device 103. Additionally, the input device 119 may be used to provide one or more input path segments 121. An input path segment 121 may be, for example, a series of input points or locations defining a portion of a rough outline of a boundary that is intended to be selected. Also, a user may use the input device 119 to provide extensions from previous input path segments 121, thereby providing extended input path segments 121.

The display device 116 may present visual displays in conjunction with the computing device 103. To this end, the display device 116 may comprise, for example, one or more liquid crystal display (LCD) screens, light emitting diode (LED) screens, gas plasma-based panel displays, LCD projectors, cathode ray tubes (CRTs), or other devices of like capability. Additionally, the display device 116 may provide a user interface 123 generated by the computing device 103. The user interface 123 may present visual representations of images 109, information, input regions, functionality, control elements, etc. and facilitate interaction with and control of the computing device 103.

Various applications and/or other functionality may be executed in the computing device 103 according to various embodiments. For example, an image processing engine 125 and possibly other applications, services, processes, systems, engines, or functionality may be executed in the computing device 103.

The image processing engine 125 may be executed to perform image 109 processing tasks. To this end, the image processing engine 125 may be capable of editing various characteristics of the image 109. For example, the image processing engine 125 may be capable of performing cut/copy/paste functions, visual properties editing functions (e.g., contrast adjustment, luminance adjustment, etc.), filtering operations (e.g., sharpening, blurring, etc.), and/or other operations.

The image processing engine 125 is also configured to facilitate the selection of an object boundary shown within the image 109. To this end, the image processing engine 125 may include boundary probability logic 126, selection path logic 129, and possibly other logic not discussed in detail herein. It is emphasized that the arrangement shown in FIG. 1 is merely one arrangement among others in accordance with the present disclosure.

The boundary probability logic 126 may generate an initial boundary probability map 133, one or more weighted boundary probability maps 136, and possibly perform other functionality. The initial boundary probability map 133 may be, for example, a mapping of values to pixels 111, wherein the values correspond to a probability that the pixels 111 are part of a boundary represented in the image 109. To this end, the initial boundary probability map 133 may include multiple initial boundary probability values 139, wherein each initial boundary probability value 139 corresponds to one or more pixels 111. The initial boundary probability values 139 may represent, for example, a calculated probability that the corresponding pixel 111 is part of an object boundary shown in the image 109.

Each weighted boundary probability map 136 may be based at least in part on the initial boundary probability map 133. Additionally, each weighted boundary probability map 136 may include weighted boundary probability values 143 that are based on a weighting of corresponding initial boundary probability values 139, as will be described later. Thus, each weighted boundary probability value 143 may correspond to one or more pixels 111 for the image 109.

The selection path logic 129 may generate selection paths 149 and possibly other information. A selection path 149 may be, for example, a path that defines a region of the image 109 that is to be made active for image processing or other purposes. As such, a selection path 149 may be regarded as indicating a target object boundary within the image 109 that is to be selected for an image editing function.

Although portions of the present disclosure make reference to hardware, software, and/or functionality executed in a single computing device 103, it is emphasized that various functionality may be split between multiple computing devices 103. For example, some functionality may be off-loaded to one or more server devices or other types of devices via a network (not shown).

Next, a general description of the operation of the various components of the computing device 103 is provided. It is assumed that the image processing engine 125 is running in the computing device 103 and that the image processing engine 125 has obtained the image 109 from the data store 106.

To begin, a first input path segment 121 may be provided to the image processing engine 125. To this end, the input device 119 may be used by a user to trace around or near a portion of the boundary that is intended to be selected. In various embodiments, the input path segment 121 may be a continuous path that corresponds to a trace route provided by a user. In alternative embodiments, the input device 119 may provide a discontinuous series of points, and the image processing engine 125 may convert the points into one or more input path segments 121. In any case, the input path segment 121 may include input points that correspond to particular one or more pixels 111 of the image 109.

Additionally, the image processing engine 125 may generate an initial boundary probability map 133. Various methods may be used to generate the initial boundary probability map 133. As non-limiting examples, the boundary probability logic 126 may perform edge detection or other operations by analyzing color values, color and/or intensity gradients, structural features, or other characteristics shown in the image 109. Additionally, filtering (e.g., de-speckling, de-blurring, sharpening, etc.) or other processes may be performed on the image 109 to facilitate generating the initial boundary probability map 133. Also, the selection path logic 129 may define that the selection path 149 is to be within a predetermined distance from the input path segments 121. In any case, the boundary probability logic 126 may determine the initial boundary probability values 139 corresponding to the pixels 111 of at least part of the image 109.

In some embodiments, the initial boundary probability map 133 may be generated for the entire image 109. Other embodiments may reduce computation times by generating a first initial boundary probability map 133 that corresponds to a predetermined region near the first input path segment 121. As extended input path segments 121 are input, additional initial boundary probability maps 133 that correspond to the selection path 149 and the extended input path segments 121 may be generated on an as-needed basis. Next, the selection path logic 129 may generate a selection path 149 based on the initial boundary probability map 133 and the first input path segment 121. To this end, the selection path logic 129 may analyze the initial boundary probability values 139 of the initial boundary probability map 133 and identify, for example, pixels 111 that form a continuous path, have the highest net initial boundary probability values 139, and that are near the first input path segment 121. The identified pixels 111 may be selected as forming the selection path 149. Other methods of determining the selection path 149 may be used as well. Upon the selection path 149 being determined, a visual representation of the selection path 149 may be provided on the user interface 123.

With the selection path 149 being generated, the image processing engine 125 may then generate a weighted boundary probability map 136 based on the selection path 149. Various methods may be used to generate the weighted boundary probability map 136. For example, the initial boundary probability values 139 that correspond to the same pixels 111 as the selection path 149 may have their values weighted to generate the weighted boundary probability values 143. In other embodiments, initial boundary probability values 139 that correspond to pixels 111 that are within a predefined distance from the pixels 111 corresponding to the selection path 149 may have their values weighted. To the extent that the weighted boundary probability values 143 are determined based on distances from the selection path 149, the boundary prediction logic 126 may be configured to calculate these distances. The distance may be, for example, the distance from a particular pixel 111 to a pixel 111 that corresponds to the selection path 149.

Even further, some embodiments may apply a uniform kernel, Gaussian kernel, triangular kernel, or any other process to determine the weighted boundary probability values 143 of the weighted boundary probability map 136. In this sense, pixels 111 may have their initial boundary probability values 139 weighted by applying a uniform kernel, a Gaussian kernel, a triangular kernel, etc., based on the locations of the pixels 111 with respect to the selection path 149. Even further, the weighting of the initial boundary probability map 133 may be based on the following equation:

$$P_i' = P_i + P_i * W(d) \quad \text{(eq. 1)},$$

where $P_i$ is an initial boundary probability value 139 at a position i, $P'_i$ is a weighted boundary probability value 143 at the position i, and W(d) is based on the following equation:

$$W(d) = \alpha * e^{\frac{-d}{2\sigma^2}} + \beta * \max\left(1 - \frac{|d|}{\theta}, 0\right) + C, \quad \text{(eq. 2)}$$

where d is a distance between one of the pixels 111 corresponding to the position i and one of the pixels 111 corresponding to the selection path 149, σ and θ are variables to control a respective kernel size, α and β are weighting values, and C is a constant value.

Also, the speed at which the user traces respective portions of the object boundary shown in the image 109 may influence the weighting of the initial boundary probability map 133. For instance, areas of the initial boundary probability map 133 that are near a portion of the boundary that was traced relatively slowly may have a relatively heavy weighting. Similarly, areas of the initial boundary probability map 133 that are near a portion of the boundary that was traced relatively fast may have a relatively light weighting. Thus, a weighted boundary probability map 136 may be generated by weighting the initial boundary probability values 139 of the initial boundary probability map 133 based on the selection path 149.

Next, the user may provide a second input path segment 121, which may be an extension of the first input path segment 121. To this end, the user may use the input device 119, for example, to trace a rough outline near a second portion of the boundary that is to be selected, similar to as discussed above with reference to inputting the first input path segment 121. The second input path segment 121 may be, for example, an extension from the selection path 149.

The selection path logic 129 may then use the weighted boundary probability map 136, the second input path segment 121, and possibly other information to replace the previous selection path 149 with a new selection path 149. To this end, the selection path logic 129 may use, for example, a similar method as was discussed above with reference to determining the previous selection path 149. In particular, the weighted boundary probability values 143 of the weighted boundary probability map 136 may be analyzed, and pixels 111 that form a continuous path, have the highest net weighted boundary probability value 143, and are near the selection path 149 may be identified. These identified pixels 111 may be selected as forming the replacement selection path 149. In some embodiments, the selection path logic 129 may define that the replacement selection path 149 is to be within a predetermined distance from one or more of the input path segments 121. Other methods of determining the replacement selection path 149 may be used as well.

The process of inputting extended input path segments 121 and generating the updated selection path 149 may be repeated. For instance, a third input path segment 121 may be input, and a new weighted boundary probability map 136 may be generated by weighting the initial boundary probability values 139 of the initial boundary probability map 133 using the most recently generated selection path 149. Thereafter, a replacement selection path 149 may be generated using the most recently generated weighted boundary probability map 136, the second input path segment 121, and possibly other information. The process may be repeated until there are no more input path segments 121.

Additionally, the process may be stopped upon the occurrence of various predefined events. For example, the process may be stopped upon an indication from a user that the last input path segment 121 was input. In various alternative embodiments, the process may be stopped upon determining that an ending point of an input path segment 121 is located on or near the beginning point of the first input path segment 121. Such an occurrence may indicate, for example, that a region within the image has 109 has been enclosed within the input path segments 121 that now form the selection path 149.

Upon the final selection path 149 being generated, the region indicated by the final selection path 149 may be selected/activated, and image processing functions may subsequently be performed to the region, as may be appreciated by a person having ordinary skill in the art.

Turning now to FIGS. 2A-2G, shown is a progressive series of examples of a user interface 123 provided by the computing device 103 (FIG. 1) according to various embodiments. It is understood that FIGS. 2A-2G provide merely examples of the various functionality in accordance with the present disclosure.

Figure 2A:
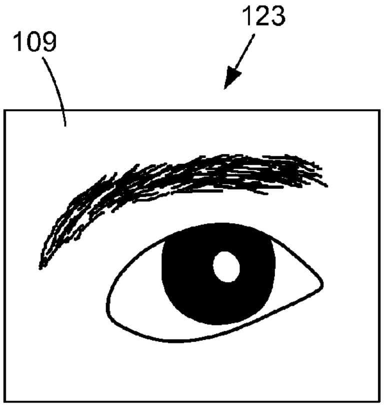
FIGS. 2A-2H are drawings of examples of a user interface provided by the computing device of FIG. 1 according to various embodiments of the present disclosure.
Figure 2B:
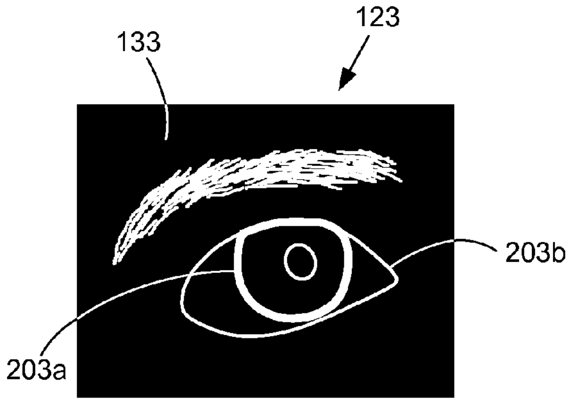

With reference to FIG. 2A, shown is the user interface 123 after an image 109 of an eye has been obtained by the image processing engine 125 (FIG. 1) and displayed in the user interface 123. With reference now to FIG. 2B, shown is a representation of the initial boundary probability map 133 corresponding to the image 109 of FIG. 2A. It is noted that various embodiments may or may not provide a rendering of the initial boundary probability map 133 in the user interface 123. In the example shown, higher initial boundary probability values 139 (FIG. 1) are represented with a heavier line than lower initial boundary probability values 139. Thus, in the present example, the boundary probability logic 126 (FIG. 1) has determined that the boundary 203*a* has greater initial boundary probability values 139 than those of the boundary 203*b*, as shown by the boundary 203*a* having a heavier line.

Figure 2C:
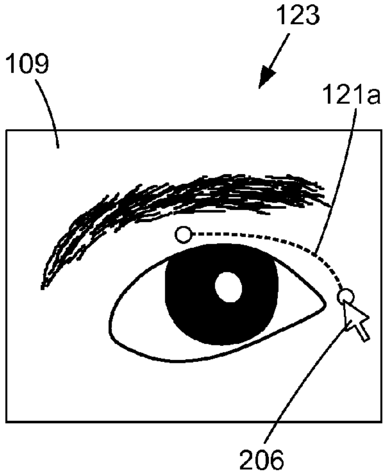

Moving to FIG. 2C, shown is the user interface 123 after a user has traced an outline near a portion of the eye opening shown in the image 109. The user interface 123 shown includes a rendering of the image 109, the first input path segment 121 (referred to herein as the first input path segment 121*a*), and a cursor 206. As may be appreciated, the first input path segment 121*a* may be created by the user dragging the cursor 206 from the start point to the end point of the first input path segment 121*a* using the input device 119 (FIG. 1).

Figure 2D:
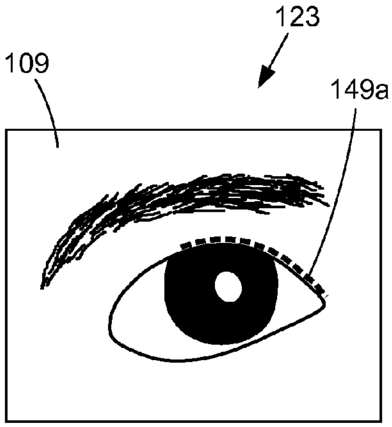

Turning to FIG. 2D, shown is the user interface 123 after the selection path logic 129 (FIG. 1) has generated the first selection path 149 (referred to herein as the first selection path 149*a*). The first selection path 149*a* has been generated based on the initial boundary probability map 133 (FIG. 2B) and the first input path segment 121*a* (FIG. 2C).

Figure 2E:
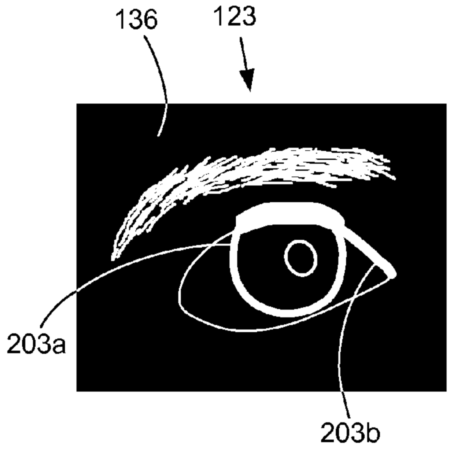

Turning to FIG. 2E, shown is a representation of the weighted boundary probability map 136 after the initial boundary probability map 133 of FIG. 2B has been weighted based on the first selection path 149*a* (FIG. 2D). Various embodiments may or may not provide a rendering of the weighted boundary probability map 136 in the user interface 123. In the present example, the boundary prediction logic 126 (FIG. 1) has increased the weight of the initial boundary probability values 139 (FIG. 1) that are within a predefined distance from the first selection path 149. Thus, as compared to the initial boundary probability map 133 in FIG. 2B, the initial boundary probability values 139 corresponding to the boundary 203*b* have been weighted.

Figure 2F:
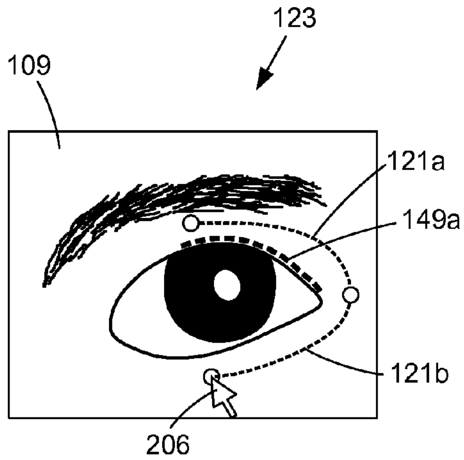

With reference now to FIG. 2F, shown is the user interface 123 after a user has traced an outline near another portion of the eye opening shown in the image 109. The user interface 123 shown includes a rendering of the image 109, the first selection path 149*a*, the first input path segment 121, a second input path segment 121 (referred to herein as the second input path segment 121*b*), and a cursor 206. The second input path segment 121*b* may have been created by the user dragging the cursor 206 from the end point of the first input path segment 121*a* to the end point of the second input path segment 121*b* using the input device 119 (FIG. 1).

Figure 2G:
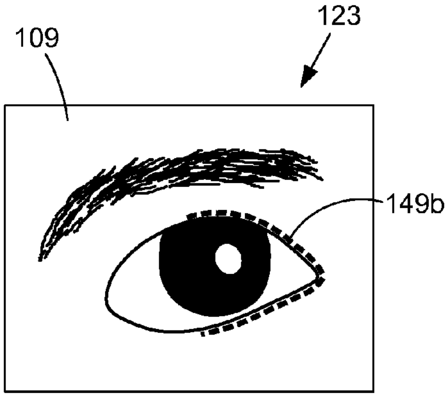

With reference now to FIG. 2G, shown is an example of a user interface 123 that may be generated upon a replacement selection path 149 (referred to herein as the replacement selection path 149*b*) being determined. The replacement selection path 149*b* of FIG. 2G is based on the weighted boundary probability map 136 of FIG. 2E and the second input path segment 121*b* of FIG. 2F.

Figure 2H:
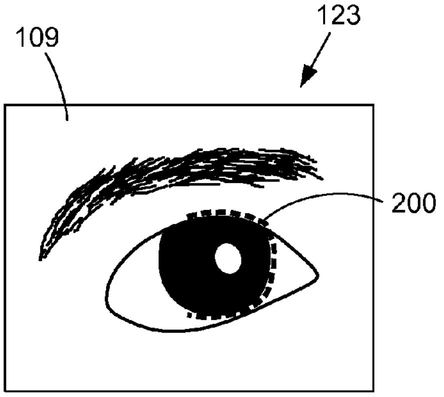

Turning now to FIG. 2H, shown is an example of a user interface 123 that may be generated in the event that a conventional selection path 200 is generated. The conventional selection path 200 may be generated, for example, by not generating and not taking into account a weighted boundary probability map 136. As shown, the conventional selection path 200 in FIG. 2H corresponds to the iris shown in the image 109, while the replacement selection path 149*b* in FIG. 2G corresponds to the eye opening shown in the image 109.

Figure 3:
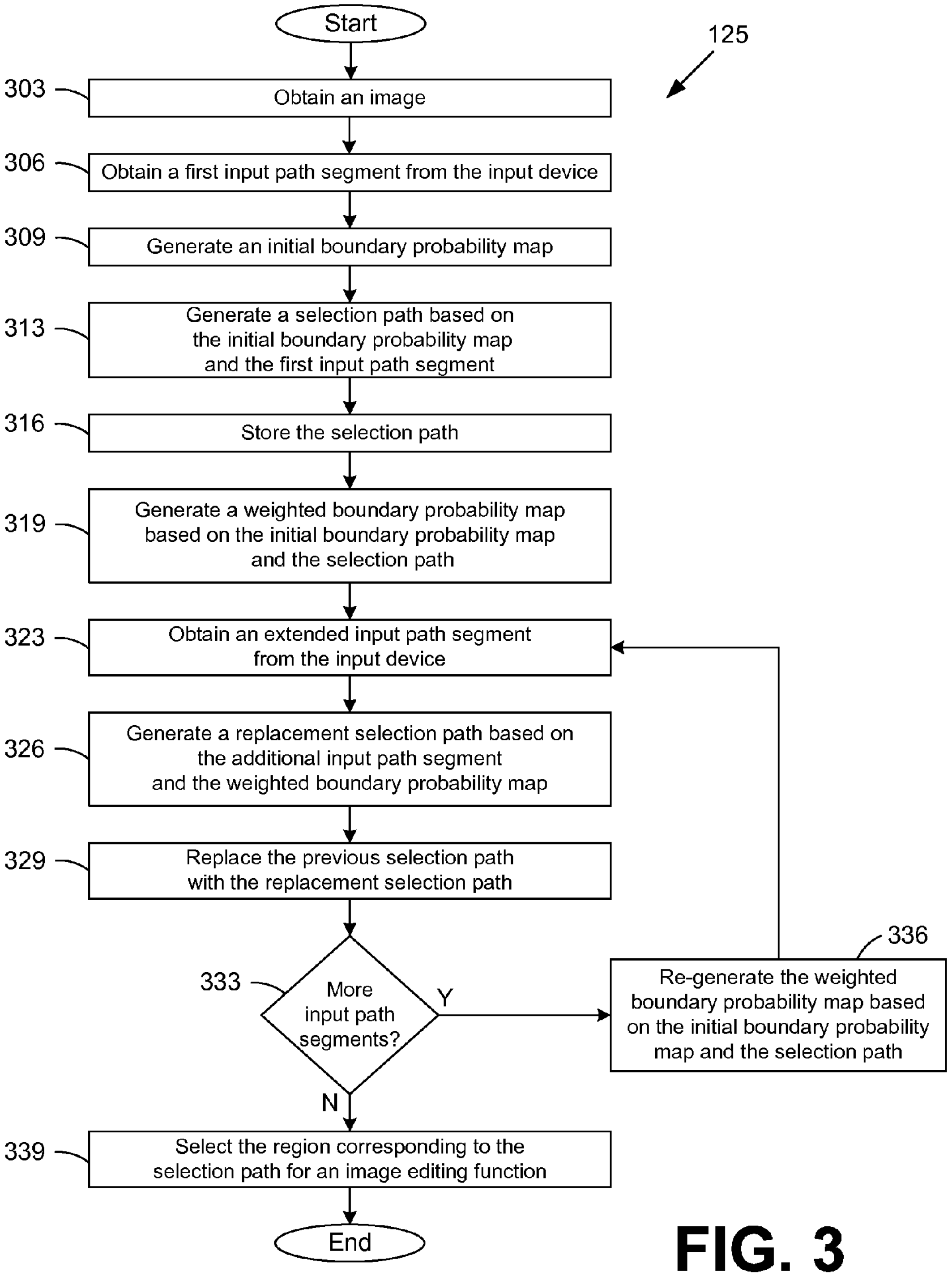
FIGS. 3 and 4A-4B are flowcharts illustrating examples of functionality implemented as portions of an image processing engine in the computing device of FIG. 1 according to various embodiments of the present disclosure.

Referring next to FIG. 3, shown is a flowchart that provides one example of the operation of a portion of the image processing engine 125 according to various embodiments. It is understood that the flowchart of FIG. 3 provides merely an example of the many different types of functional arrangements that may be employed to implement the operation of the portion of the image processing engine 125 as described herein. As an alternative, the flowchart of FIG. 3 may be viewed as showing an example of steps of a method implemented in the computing device 103 (FIG. 1) according to one or more embodiments. In the flowchart of FIG. 3, the image processing engine 125 generates the initial boundary probability map 133 (FIG. 1) for the entire image 109 (FIG. 1) for use in its processing tasks.

Beginning with box 303, the image processing engine 125 obtains the image 109. Next, as shown in box 306, the image processing engine 125 obtains the first input path segment 121 (FIG. 1), for example, from the input device 119 (FIG. 1). The image processing engine 125 then generates the initial boundary probability map 133, as shown in box 309. As previously discussed, the initial boundary probability map 133 may be based on a color, a structural pattern, a gradient, and/or other characteristics for the image 109.

Thereafter the image processing engine 125 moves to box 313 and generates a selection path 149 (FIG. 1) based on the initial boundary probability map 133 and the first input path segment 121. Next, as shown in box 316, the image processing engine 125 stores the selection path 149, for example, in the data store 106 (FIG. 1). Moving to box 319, the image processing engine 125 then generates a weighted boundary probability map 136 (FIG. 1) based on the initial boundary probability map 133 and the selection path 149.

Thereafter, the image processing engine 125 obtains an extended input path segment 121 from the input device 119, as shown in box 323. In box 326, a replacement selection path 149 is generated based on the extended input path segment 121, and the previously generated weighted boundary probability map 136, and possibly other information. As shown in box 329, the previously selection path 149 is then replaced with the replacement selection path 149.

In box 333, it is determined whether there are more extended input path segments 121 to obtain from the input device 119. If there are more extended input path segments 121, the image processing engine 125 moves to box 336 and replaces the previously generated weighted boundary probability map 136 with a replacement weighted boundary probability map 136 that is based on the initial boundary probability map 133 and the most recent replacement selection path 149. Thereafter, the image processing engine 125 returns to box 323, and the process is repeated as shown.

Upon the final input path segment 121 being processed, the image processing engine 125 moves from box 333 to box 339 and selects the region that corresponds to the final selection path 149. For example, the region defined by the final selection path 149 may be selected for an image editing function. Thereafter, the process ends.

Figure 4A:
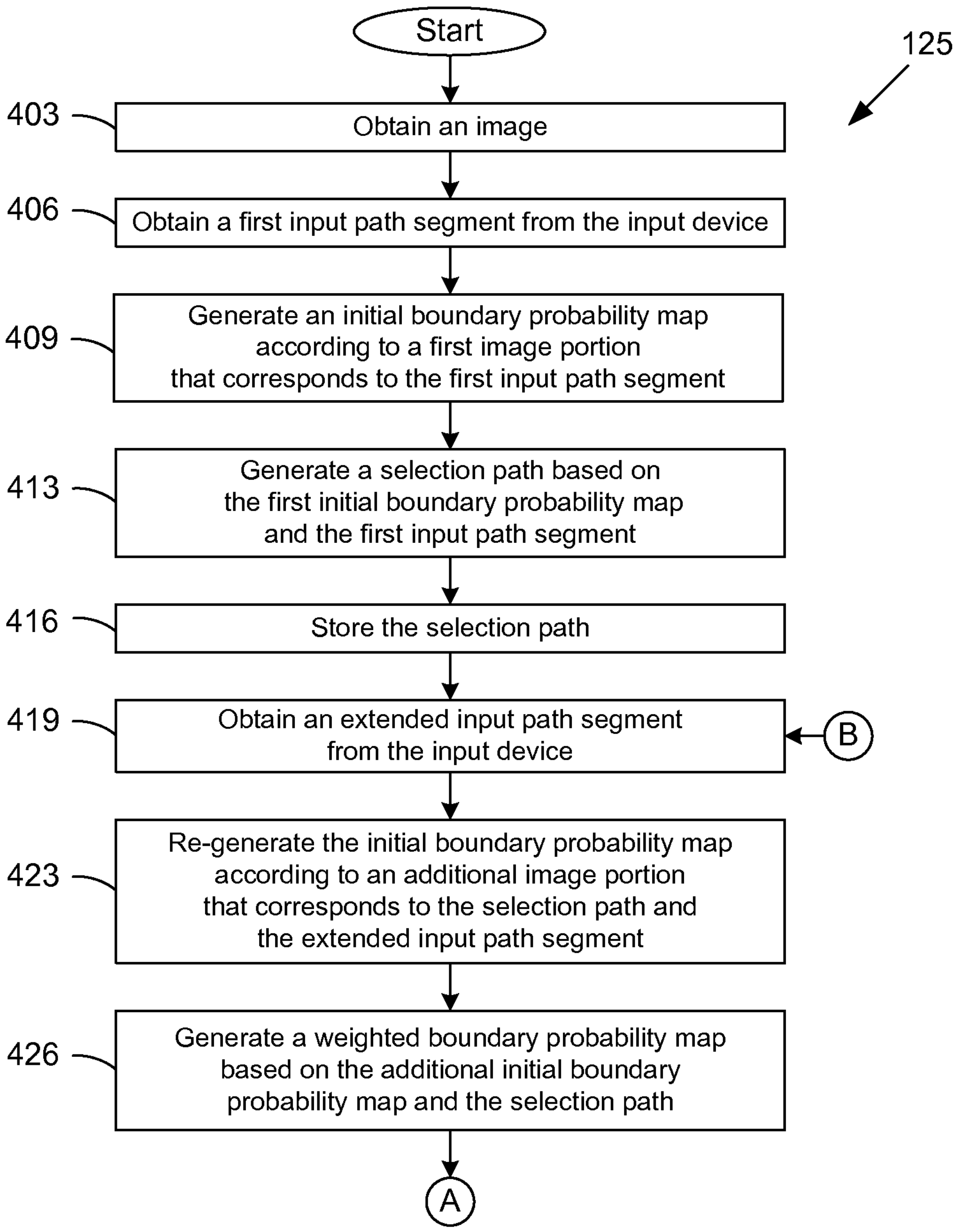
Figure 4B:
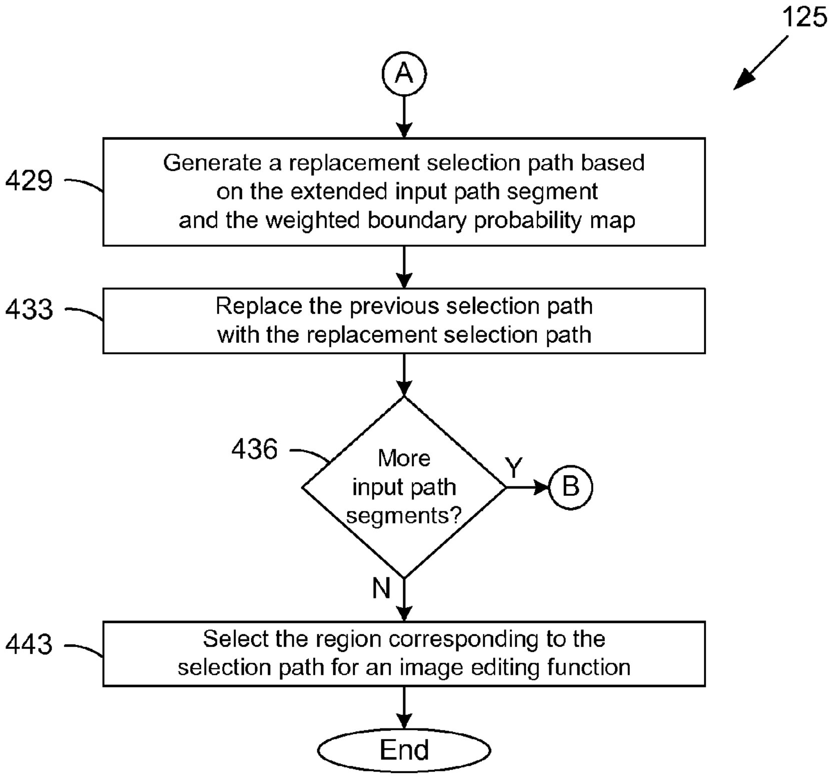

Turning now to FIGS. 4A-4B, shown is a flowchart that provides one example of the operation of a portion of the image processing engine 125 according to various embodiments. It is understood that the flowchart of FIGS. 4A-4B provides merely an example of the many different types of functional arrangements that may be employed to implement the operation of the portion of the image processing engine 125 as described herein. As an alternative, the flowchart of FIGS. 4A-4B may be viewed as showing an example of steps of a method implemented in the computing device 103 (FIG. 1) according to one or more embodiments. In the flowchart of FIGS. 4A-4B, the image processing engine 125 generates portions of the initial boundary probability map 133 (FIG. 1) on an as-needed basis for use in its processing tasks as the portion.

Beginning with box 403, the image processing engine 125 obtains the image 109 (FIG. 1). Next, as shown in box 406, the image processing engine 125 obtains the first input path segment 121 (FIG. 1) from the input device 119 (FIG. 1). As shown in box 409, the image processing engine 125 then generates the initial boundary probability map 133 according to a first image 109 portion that corresponds to the first input path segment 121, thereby generating a first initial boundary probability map 133. The first image 109 portion may be, for example, a spatial range of the image 109 that is near the first input path segment 121.

Thereafter the image processing engine 125 moves to box 413 and generates a selection path 149 (FIG. 1) based on the first initial boundary probability map 133 and the first input path segment 121. Next, as shown in box 416, the image processing engine 125 stores the selection path 149 in the data store 106 (FIG. 1). Moving to box 419, the image processing engine 125 then obtains an extended input path segment 121 from the input device 119.

In box 423, the image processing engine 125 re-generates the initial boundary probability map 133 according to an additional image portion that corresponds to the previous selection path 149 and the extended input path segment 121, thereby generating an additional initial boundary probability map 133. Thus, portions of the initial boundary probability map 133 may be generated on an as-needed basis. Next, as shown in box 426, a weighted boundary probability map 136 (FIG. 1) is generated based on the additional initial boundary probability map 133 and the selection path 149.

In box 429, the image processing engine 125 generates a replacement selection path 149 based on the extended input path segment 121, the weighted boundary probability map 136, and possibly other information. The previous selection path 149 is then replaced with the replacement selection path 149 in box 433. The image processing engine 125 then moves to box 436 and determines whether there are more extended input path segments 121 to be received from the input device 119. If so, the image processing engine 125 returns to box 419, and the process is repeated as shown.

Upon the final input path segment 121 being processed, the image processing engine 125 moves from box 436 to box 443 and selects the region that corresponds to the final selection path 149. For example, the region defined by the final selection path 149 may be selected for an image editing function. Thereafter, the process ends.

Figure 5:
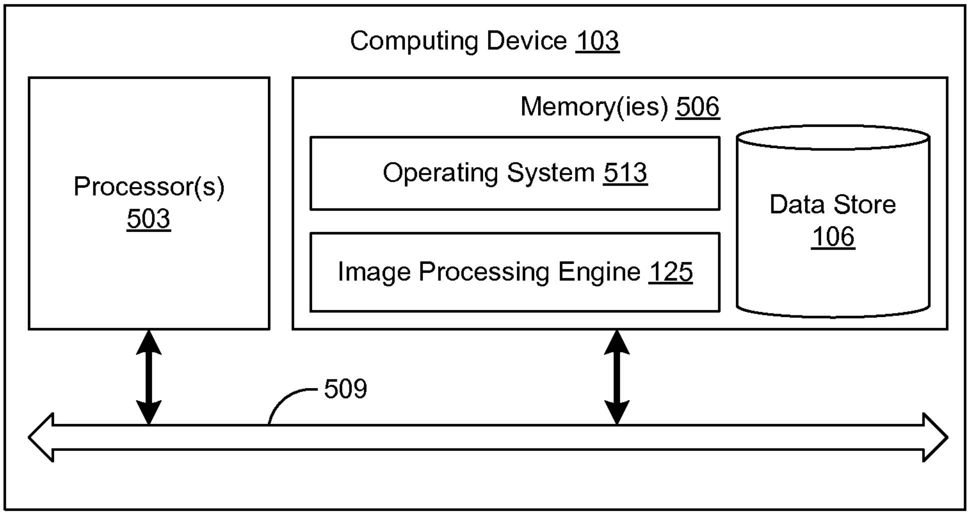
FIG. 5 is a schematic block diagram that provides an example illustration of the computing device of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is the image processing engine 125 and potentially other applications. In addition, an operating system 513 may be stored in the memory 506 and executable by the processor 503. Also stored in the memory 506 may be the data store 106 and other data.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the image processing engine 125 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4A-4B show the functionality and operation of an implementation of portions of the image processing engine 125. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each box may represent a circuit or a number of interconnected circuits to implement the specified logical function(s).

Although the flowcharts of FIGS. 3 and 4A-4B show a specific order of execution, it is understood that the order of execution may differ from that which is shown. For example, the order of execution of two or more boxes may be varied relative to the order shown. Also, two or more boxes shown in succession in FIGS. 3 and 4A-4B may be executed concurrently or with partial concurrence. Further, in some embodiments, one or more of the boxes shown in FIGS. 3 and 4A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image processing engine 125, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:

code that obtains an image comprising a plurality of pixels;

code that obtains a first input path segment from an input device, the first input path segment corresponding to an object boundary shown in the image, the first input path segment comprising a plurality of first input points corresponding to a plurality of the plurality of pixels;

code that generates an initial boundary probability map for at least a portion of the image, the initial boundary probability map comprising a plurality of boundary probability values corresponding to a plurality of the plurality of pixels;

code that generates a selection path based on the first input path segment and the initial boundary probability map, the selection path indicating a target object boundary within the image that is to be selected for an image editing function, the selection path comprising a plurality of selection points corresponding to a plurality of the plurality of pixels;

code that obtains a second input path segment from the input device, the second input path segment corresponding to the object boundary shown in the image, the second input path segment comprising a plurality of second input points corresponding to a plurality of the plurality of pixels;

code that generates a weighted boundary probability map by weighting a plurality of the boundary probability values of the initial boundary probability map based on the selection path; and code that generates a replacement selection path based on the weighted boundary probability map and the second input path segment.

2. The computer-readable medium of claim 1, wherein the second input path segment is an extension from the first input path segment.

3. The computer-readable medium of claim 1, wherein the code that generates the initial boundary probability map for at least a portion of the image generates the initial boundary probability map for all of the image.

4. The computer-readable medium of claim 1, wherein:

the code that generates the initial boundary probability map for at least a portion of the image further comprises:

code that generates the initial boundary probability map according to a first image portion that corresponds to the first input path segment, thereby generating a first initial boundary probability map; and code that re-generates the initial boundary probability map according to a second image portion that corresponds to the selection path and the second input path segment, thereby generating a second initial boundary probability map;

the code that generates the selection path generates the selection path based on the first initial boundary probability map; and the code that generates the weighted boundary probability map generates the weighed boundary probability map based on the second initial boundary probability map.

5. The computer-readable medium of claim 1, wherein the code that generates the weighted boundary probability map further comprises code that weights a plurality of the boundary probability values of the initial boundary probability map based on a plurality of distances between a plurality of the pixels in the image and a plurality of the pixels corresponding to the selection path.

6. The computer-readable medium of claim 5, wherein the code that generates the weighted boundary probability map further comprises code that weights the boundary probability values of the initial boundary probability map based on the distances by applying a Gaussian kernel, a uniform kernel, or a triangular kernel.

7. The computer-readable medium of claim 5, wherein the code that generates the weighted boundary probability map generates the weighted boundary probability map based on the following first equation:

$$P_i' = P_i + P_i * W(d),$$

where $P_i$ is one of the boundary probability values at a position i, $P'_i$ is a weighted probability value at the position i, and W(d) is based on the following second equation:

$$W(d) = \alpha * e^{\frac{-d}{2\sigma^2}} + \beta * \max\left(1 - \frac{|d|}{\theta}, 0\right) + C,$$

where d is one of the distances between the one of the pixels corresponding to the position i and one of the pixels corresponding to the selection path, σ and θ are a plurality of variables for a respective kernel size, α and β are a plurality of weighting values, and C is a constant value.

8. The computer-readable medium of claim 1, the program further comprising:

code that obtains a plurality of extended input path segments indicating the region within the image that is to be selected for the image editing function; and code that generates a plurality of additional replacement selection paths based on the extended input path segments and a plurality of additional weighted boundary probability maps, each one of the additional weighted boundary probability maps being based on the initial boundary probability map and a previous one of the additional replacement selection paths.

9. The computer-readable medium of claim 1, wherein the code that generates the initial boundary probability map is based on a color, a structural pattern, or a gradient for the image.

10. The computer-readable medium of claim 1, wherein the selection path is within a predetermined distance from the first input path segment.

11. The computer-readable medium of claim 1, wherein the replacement selection path is within a predetermined distance from the first input path segment.

12. The computer-readable medium of claim 1, wherein at least one of the first input path segment and the second input path segment is a continuous path that corresponds to a trace route provided by a user.

13. The computer-readable medium of claim 1, wherein at least one of the first input path segment and the second input path segment is converted from a discontinuous series of points.

14. The computer-readable medium of claim 1, wherein the weighted boundary probability map is further based at least in part on a speed at which a trace route is provided by a user.

15. A system, comprising:

at least one computing device; and an image processing engine executable in the at least one computing device, the image processing engine comprising:

logic configured to obtain a first input path segment corresponding to an object boundary shown in an image;

logic configured to generate an initial boundary probability map of at least a portion of the image;

logic configured to generate a selection path based on the initial boundary probability map and the first input path segment; logic configured to obtain a second input path segment corresponding to the object boundary shown in the image;

logic configured to generate a weighted boundary probability map by weighting at least a portion of the initial boundary probability map based on the selection path; and logic configured to generate a replacement selection path based on the weighted boundary probability map and the second input path segment.

16. The system of claim 15, wherein the second input path segment is an extension from the first input path segment.

17. The system of claim 15, wherein the logic configured to generate the initial boundary probability map of at least a portion of the image generates the initial boundary probability map for all of the image.

18. The system of claim 15, wherein:
the logic that generates the initial boundary probability map for at least a portion of the image further comprises:
logic configured to generate the initial boundary probability map according to a first image portion that corresponds to the first input path segment, thereby generating a first initial boundary probability map; and
logic configured to re-generate the initial boundary probability map according to a second image portion that corresponds to the selection path and the second input path segment; thereby generating a second initial boundary probability map;
logic configured to generate the selection path generates the selection path based on the first initial boundary probability map; and
logic configured to generate the weighted boundary probability map generates the weighted boundary probability map based on the second initial boundary probability map.

19. The system of claim 15, wherein the image processing engine further comprises:
logic configured to obtain a plurality of extended input path segments corresponding to the object boundary shown in the image; and
logic configured to generate a plurality of additional replacement selection paths based on the extended input path segments and a plurality of additional weighted boundary probability maps, each one of the additional weighted boundary probability maps being based on the initial boundary probability map and a previous one of the additional replacement selection paths.

20. The system of claim 15, wherein:
the image further comprises a plurality of pixels;
the initial boundary probability map further comprises a plurality of boundary probability values corresponding to a plurality of the plurality of pixels;
the selection path further comprises a plurality of selection points corresponding to a plurality of the plurality of pixels; and
the logic configured to generate the weighted boundary probability map by weighting the initial boundary probability map based on the selection path is further configured to weight the boundary probability values based on a plurality of distances between a plurality of the pixels corresponding to the selection points and a plurality of the pixels corresponding to the boundary probability values.

21. The system of claim 15, wherein the logic configured to generate the weighted boundary probability map further comprises logic that weights a plurality of boundary probability values of the initial boundary probability map based on a plurality of distances between a plurality of first pixels in the image and a plurality of second pixels corresponding to the selection path by applying a Gaussian kernel, a uniform kernel, or a triangular kernel.

22. The system of claim 15, further comprising an input device in communication with the at least one computing device, the input device being configured to transmit the first input path segment and the second input path segment to the at least one computing device.

23. The system of claim 22, wherein the input device is embodied in the form of a mouse, a touch pad, or a touch screen, or a keyboard.

24. A method, comprising the steps of:
obtaining, in at least one computing device, a first input path segment corresponding to an object boundary shown in an image;
generating, in the at least one computing device, an initial boundary probability map of at least a portion of the image;
generating, in the at least one computing device, a selection path based on the initial boundary probability map and the first input path segment;
obtaining, in the at least one computing device, a second input path segment corresponding to the object boundary shown in the image;
generating, in the at least one computing device, a weighted boundary probability map based on the initial boundary probability map and the selection path; and
replacing, in the at least one computing device, the selection path with a replacement selection path based on the weighted boundary probability map and the second input path segment.

25. The method of claim 24, wherein the second input path segment is an extension from the first input path segment.

26. The method of claim 24, wherein the step of generating the initial boundary probability map of at least a portion of the image further comprises generating the initial boundary probability map for all of the image.

27. The method of claim 24, wherein:
the step of generating the initial boundary probability map of at least a portion of the image further comprises:
generating the initial boundary probability map according to a first image portion that corresponds to the first input path segment, thereby generating a first initial boundary probability map; and
re-generating the initial boundary probability map according to a second image portion that corresponds to the selection path and the second input path segment, thereby generating a second initial boundary probability map;
the step of generating the selection path generates the selection path based on the first initial boundary probability map; and
the step of generating the weighted boundary probability map generates the weighted boundary probability map based on the second initial boundary probability map.

28. The method of claim 24, further comprising the steps of:
obtaining, in the at least one computing device, a plurality of extended input path segments corresponding to the object boundary shown in the image;
generating, in the at least one computing device, a plurality of additional replacement selection paths based on the extended input path segments and a plurality of additional weighted boundary probability maps, each one of the additional weighted boundary probability maps being based on the initial boundary probability map and a previous one of the additional replacement selection paths.

29. The method of claim 24, wherein:
the image further comprises a plurality of pixels;
the initial boundary probability map further comprises a plurality of boundary probability values corresponding to a plurality of the plurality of pixels;
the selection path further comprises a plurality of selection points corresponding to a plurality of the plurality of pixels; and
the step of generating the weighted boundary probability map further comprises weighting a plurality of the boundary probability values based on a plurality of distances between a plurality of the pixels corresponding to the selection points and a plurality of the pixels corresponding to the boundary probability values.

30. The method of claim 24, wherein the step of generating the weighted boundary probability map further comprises weighting a plurality of boundary probability values of the initial boundary probability map based on a plurality of distances between a plurality of first pixels in the image and a plurality of second pixels corresponding to the selection path by applying a Gaussian kernel, a uniform kernel, or a triangular kernel.

31. The method of claim 24, wherein the first input path segment and the second input path segment are obtained from an input device embodied in the form of a mouse, a touch pad, or a touch screen, or a keyboard.

32. The method of claim 24, wherein the initial boundary probability map is based on a color, a structural pattern, or a gradient for the image.

* * * * *